United States Patent
Colwell et al.

(10) Patent No.: US 11,019,129 B1
(45) Date of Patent: May 25, 2021

(54) SYSTEM FOR CONTROLLING TRANSFER OF DATA TO A CONNECTED DEVICE

(71) Applicant: HEADSPIN, INC., Mountain View, CA (US)

(72) Inventors: Brien Colwell, Redwood City, CA (US); Manish Lachwani, Los Altos, CA (US)

(73) Assignee: HEADSPIN, INC., Mountain View, CA (US)

( * ) Notice: Subject to any disclaimer, the term of this patent is extended or adjusted under 35 U.S.C. 154(b) by 149 days.

(21) Appl. No.: 16/056,797

(22) Filed: Aug. 7, 2018

Related U.S. Application Data

(60) Provisional application No. 62/544,631, filed on Aug. 11, 2017, provisional application No. 62/544,644, filed on Aug. 11, 2017.

(51) Int. Cl.

| | |
|---|---|
| *H04L 29/08* | (2006.01) |
| *H04L 12/24* | (2006.01) |
| *H04L 12/26* | (2006.01) |
| *H04N 21/2385* | (2011.01) |
| *H04N 21/2662* | (2011.01) |

(52) U.S. Cl.
CPC ........ *H04L 67/025* (2013.01); *H04L 41/0896* (2013.01); *H04L 43/067* (2013.01); *H04L 43/08* (2013.01); *H04N 21/2385* (2013.01); *H04N 21/2662* (2013.01)

(58) Field of Classification Search
CPC ... H04L 41/0896; H04L 43/067; H04L 43/08; H04L 67/025; H04N 21/2385; H04N 21/2662
See application file for complete search history.

(56) References Cited

U.S. PATENT DOCUMENTS

| | | |
|---|---|---|
| 9,170,922 B1 | 10/2015 | Lachwani et al. |
| 9,660,895 B1 | 5/2017 | Bennett |
| 9,681,318 B1 | 6/2017 | Lachwani et al. |
| 9,749,888 B1 | 8/2017 | Colwell et al. |
| 2001/0049263 A1 | 12/2001 | Zhang |
| 2002/0013841 A1 | 1/2002 | Schweitzer et al. |
| 2004/0060056 A1 | 3/2004 | Wellons et al. |
| 2005/0114706 A1 | 5/2005 | DeStefano et al. |
| 2006/0195894 A1 | 8/2006 | Nita et al. |
| 2007/0121674 A1 | 5/2007 | Chen et al. |

(Continued)

OTHER PUBLICATIONS

Patel, Kamini B., "Non-final Office Action dated Feb. 27, 2019", U.S. Appl. No. 15/619,181, The United States Patent and Trademark Office, Feb. 27, 2019.

(Continued)

*Primary Examiner* — Gil H. Lee
(74) *Attorney, Agent, or Firm* — Lindauer Law, PLLC

(57) ABSTRACT

A mobile device executes an application and is remotely controlled by a client device. To reduce bandwidth used during operation, a rate limiter selects a portion of data from the mobile device to be sent to the client device. A timer value is specified. The rate limiter on the mobile device, on an ongoing basis, updates a pointer to the latest data stored in memory, such as a latest frame of an image presented by a display of the mobile device. When the elapsed time since last data sent is greater than or equal to the timer value, the latest data is sent to the client device, and the timer is reset.

20 Claims, 4 Drawing Sheets

(56) References Cited

U.S. PATENT DOCUMENTS

| | | | |
|---|---|---|---|
| 2010/0211882 A1* | 8/2010 | Bailey | H04L 67/025 |
| | | | 715/740 |
| 2011/0151864 A1 | 6/2011 | Byun et al. | |
| 2013/0074048 A1 | 3/2013 | Osawa et al. | |
| 2014/0040628 A1 | 2/2014 | Fort et al. | |
| 2014/0113625 A1 | 4/2014 | Gruber et al. | |
| 2014/0118239 A1* | 5/2014 | Phillips | G06F 9/452 |
| | | | 345/156 |
| 2014/0359139 A1 | 12/2014 | Efrati et al. | |
| 2015/0208258 A1 | 7/2015 | Brenzel et al. | |
| 2015/0269059 A1* | 9/2015 | Srinivasan | G06F 11/3664 |
| | | | 714/38.1 |
| 2015/0312127 A1 | 10/2015 | Leemet et al. | |
| 2015/0370304 A1 | 12/2015 | Salah et al. | |
| 2018/0060222 A1* | 3/2018 | Kogan | G06F 8/70 |
| 2018/0336122 A1* | 11/2018 | Kogan | G06F 11/3672 |
| 2019/0028465 A1 | 1/2019 | Allen et al. | |

OTHER PUBLICATIONS

Wu, Daxin, "Non-final Office Action dated Mar. 5, 2019", U.S. Appl. No. 15/941,674, The United States Patent and Trademark Office, Mar. 5, 2019.

Doan, Phuoc Huu, "Advisory Action dated Jan. 9, 2017", U.S. Appl. No. 14/850,798, The United States Patent and Trademark Office, Jan. 9, 2017.

Doan, Phuoc Huu, "Final Office Action dated Nov. 4, 2016", U.S. Appl. No. 14/850,798, The United States Patent and Trademark Office, Nov. 4, 2016.

Doan, Phuoc Huu, "Non-Final Office Action dated Nov. 14, 2017", U.S. Appl. No. 15/494,105, The United States Patent and Trademark Office, Nov. 14, 2017.

Doan, Phuoc Huu, "Final Office Action dated Apr. 3, 2018", U.S. Appl. No. 15/494,105, The United States Patent and Trademark Office, Apr. 3, 2018.

Joan, Phuoc Huu, "Non-Final Office Action dated Jun. 2, 2016", U.S. Appl. No. 14/850,798, The United States Patent and Trademark Office, Jun. 2, 2016.

Doan, Phuoc Huu, "Notice of Allowance dated Feb. 14, 2017", U.S. Appl. No. 14/850,798, The United States Patent and Trademark Office, Feb. 14, 2017.

Doan, Phuoc Huu, "Notice of Allowance dated Jun. 6, 2018", U.S. Appl. No. 15/494,105, The United States Patent and Trademark Office, Jun. 6, 2018.

Wu, Daxin, "Final Office Action dated Sep. 13, 2019", U.S. Appl. No. 15/941,674, The United States Patent and Trademark Office, Sep. 13, 2019.

* cited by examiner

SYSTEM FOR CONTROLLING TRANSFER OF DATA TO A CONNECTED DEVICE

PRIORITY

This application claims priority to U.S. Patent Application Ser. No. 62/544,631 filed on Aug. 11, 2017, titled "System for Remote Control of A USB Connected Device", the contents of which are incorporated by reference into the present disclosure.

This application claims priority to U.S. Patent Application Ser. No. 62/544,644 filed on Aug. 11, 2017, titled "System for Acquiring Image Data from a USB Connected Device", the contents of which are incorporated by reference into the present disclosure.

INCORPORATION BY REFERENCE

U.S. patent application Ser. No. 14/850,798 filed Sep. 10, 2015 and titled "System for Application Test", now U.S. Pat. No. 9,681,318 is hereby incorporated by reference in its entirety.

U.S. patent application Ser. No. 14/976,480 filed Dec. 21, 2015 and titled "System for Network Characteristic Assessment", now U.S. Pat. No. 9,749,888 is hereby incorporated by reference in its entirety.

U.S. Patent Application 62/298,820 filed Feb. 23, 2016 and titled "Adaptive Application Behavior Based on Assessed Network Characteristics" is hereby incorporated by reference in its entirety.

U.S. Patent Application 62/357,008 filed Jun. 30, 2016 and titled "System for Assisting in Assessment and Mitigation of Data Network Operations" is hereby incorporated by reference in its entirety.

U.S. Patent Application 62/409,810 filed Oct. 18, 2016 and titled "System for Testing Using Remote Connectivity" is hereby incorporated by reference in its entirety.

U.S. Patent Application 62/480,246 filed Mar. 31, 2017 and titled "Interactive Application Testing System Using Remote Resources" is hereby incorporated by reference in its entirety.

U.S. patent application Ser. No. 15/941,674 filed Mar. 30, 2018 and titled "Interactive Application Testing System Using Remote Resources" is hereby incorporated by reference in its entirety.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
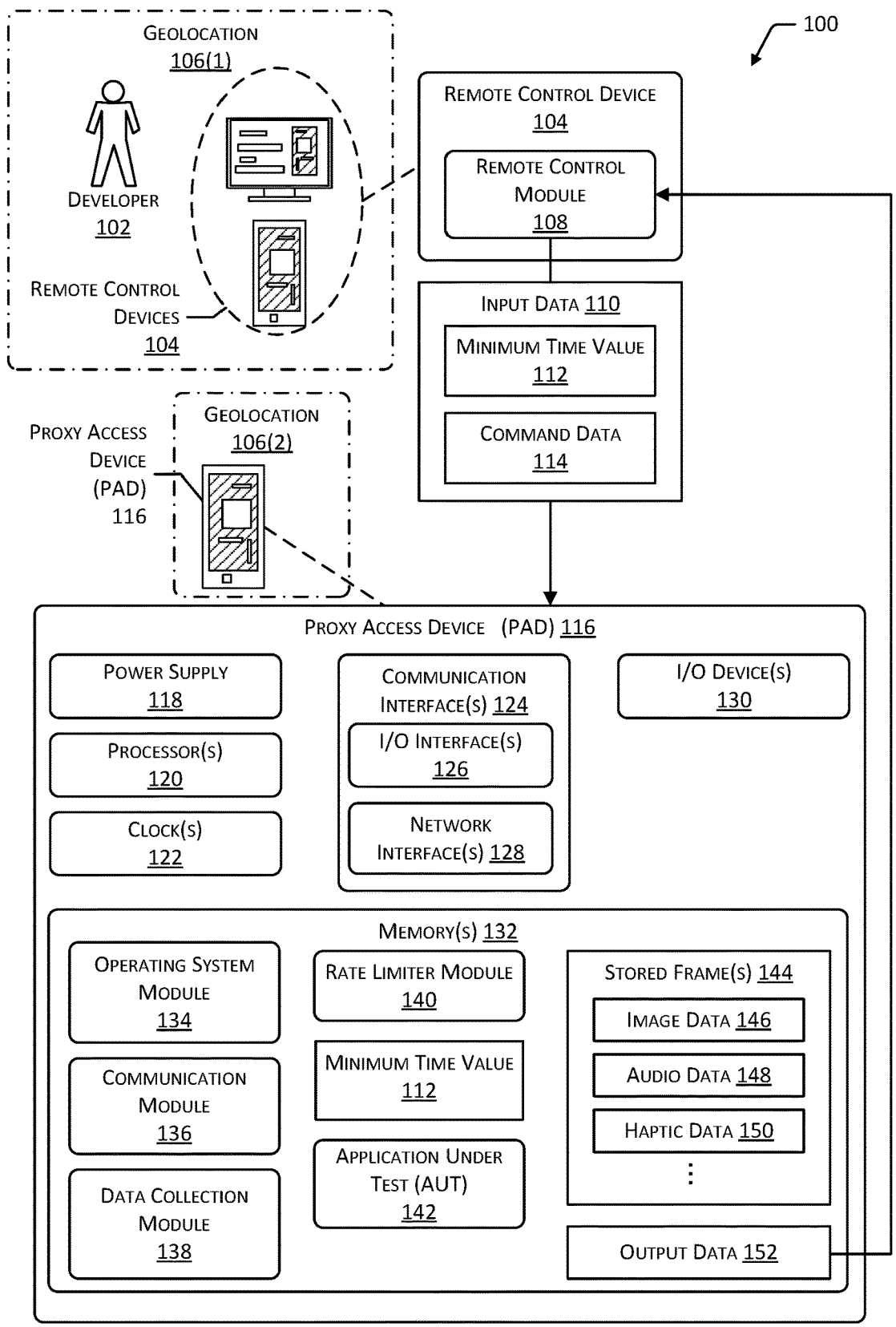
FIG. 1 depicts a system for providing data from a proxy access device (PAD) to a remote control device using a rate limiter module, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

BACKGROUND

Mobile devices executing applications that utilize networks during operation to transfer data may experience failures or otherwise produce adverse user experiences as a result of network conditions. Gathering information at the mobile device about characteristics of the network may be useful to prevent or mitigate the impacts of failures.

DETAILED DESCRIPTION

Computing devices may execute an application to provide various functions. These computing devices may include, but are not limited to, smartphones, laptops, tablet computers, embedded devices, network-enabled devices, wearable computing devices, appliances, automobiles, aircraft, and so forth. Functions provided by the application may involve retrieval of data, presentation of that data to a user, processing of data, and so forth.

Some applications may present output for a user, such as images on a display, sound from a speaker, haptic output from a haptic device, and so forth. In some situations, it is advantageous to provide this output to a remote computing device for presentation. For example, a remote control device such as a workstation or smartphone may be at a first geolocation while a proxy access device (PAD) may be at a second geolocation. A developer or automated system at the first geolocation may operate an application under test that is executing at least in part on the PAD. A first network, such as the Internet, may provide connectivity between the remote control device and the second geolocation.

At the second geolocation, a proxy host device may connect to the first network and also to the PAD. For example, the proxy host device may use an Ethernet or WiFi connection to connect to a local router which in turn connects to the Internet. The proxy host device may in turn connect to one or more PADs. The connection between the PAD and the proxy host device may use one or more of the following protocols: USB, Bluetooth, WiFi, Ethernet, Thunderbolt, and so forth.

In some situations, the application under test may access external resources using another communication interface. For example, the PAD may include a wireless cellular data network (WCDN) interface that provides network connectivity via a wireless carrier. Continuing the example, the remote control device may remotely control the application under test via the USB connection while the application under test communicates to a destination device, such as a web server, via the WCDN. This allows for testing of the application under test in real-world conditions at a geolocation other than where the developer is located.

During operation, the PAD may receive input data from the remote control device and send output data back to the PAD. For example, the input data may include configuration parameters, commands such as touch inputs, keyboard entries, mouse movements, and so forth. The output data may comprise images of what is to be presented on a display of the PAD. The data may be represented as frames. For example, the image data may comprise a frame that is a representation of an image to be presented on the display at a point in time. In another example, data may be audio data with a frame comprising a set of samples of audio data to be presented.

A data collection module may use various techniques to acquire the frames. For example, if the PAD is using the Android operating system as promulgated by Google, Inc. of Mountain View, Calif., the data collection module may utilize "minicap" such as available from GitHub to capture frames that comprise image data of the images to be presented on a display of the device.

Bandwidth limits may exist between the PAD and the remote control device. For example, a USB 3.0 connection between the PAD and the proxy host device has a particular limit of 5 gigabits per second (Gbps). In another example, the bandwidth from the proxy host device and the remote control device may be limited to 500 megabits per second (Mbps).

A number of times that an image presented by a display is updated per second is known as a "frame rate". For example, a light emitting diode display on a smartphone may have a frame rate of 60 frames per second (FPS), with images being presented or refreshed on the display every $\frac{1}{60}^{th}$ of a second. The amount of data involved in presenting an image on a display is significant. For example, if the PAD has a display with a resolution of 4096×2160 pixels, with 24 bit color depth per pixel, and 60 frames per second, the amount of data associated with display frames alone would be about 12.7 gigabits per second (Gbps). As display resolutions and frame rates increase, the amount of data continues to increase.

Conventional techniques for remote control of devices may either send all frames or use a naïve approach, such as sending every $n^{th}$ frame, where n is a non-zero natural number. Sending all frames may exceed the available bandwidth between the PAD and the remote control device. For example, even assuming data compression of 50%, the 12.7 Gbps of raw display frame data exceeds the 5 Gbps bandwidth of USB 3.1.

In the naïve approach of sending every $n^{th}$ frame, various problems become apparent. For example, some animations or screen prompts may be discarded. Data that is redundant, such as that of an unchanging display, may be sent. Additionally, a developer may experience lag if they have to wait until the $n^{th}$ frame.

Described in this disclosure is a method and device that controls transfer of data from a first device to a second device to which it is connected. A rate limiter module may execute on a first device, such as a PAD. The rate limiter module processes frames of data that may be transferred to the second device, such as the proxy host device. The proxy host device may, in turn, send the frames of data to a remote control device. In some implementations, the PAD may connect to the remote control device without the proxy host device. For example, the PAD may be connected via USB to the remote control device.

The rate limiter module is configured to send a frame of data at intervals that are at least those that specified by a minimum time value. For example, the minimum time value may be 100 milliseconds (ms). The rate limiter module processes available frames of data. Frames are available if they are accessible for processing by the rate limiter module. For example, frames of image data may be stored in a buffer memory that is accessible to the rate limiter module. The rate limiter module starts a timer with a duration of the minimum time value.

Before timeout of the timer, if frames are available, the rate limiter module determines if the frames that are available are different from previously stored frames. For example, each frame may be processed with a hash function to determine a hash value. If two frames have different hash values, they may be deemed to be different. Different frames may be stored, retained in the buffer memory, referenced in a pointer list, and so forth.

After timeout of the timer, the rate limiter module checks for stored frames. Of the stored frames, a latest frame is determined and then sent. For example, the frame with the most recent timestamp or highest frame number may be selected and sent to the remote control device via the USB communication interface. The stored frames may be cleared, or the pointers thereto in the pointer list deleted or overwritten. The timer then restarts, and the process proceeds again.

If no different frames are available during the timer interval, after timeout the rate limiter module waits for a next frame to become available. In some implementations this next frame may be determined to be a frame that is different from a previously stored frame. As the next frame is available, it is then sent without waiting for the minimum time interval. The frame may be cleared, or the pointer thereto deleted or overwritten. The timer then restarts, and the process proceeds as above.

While the rate limiter module is described with respect to use during remote control of the PAD by another device such as the remote control device, it is understood that the rate limiter module may be used in other ways. For example, the rate limiter module may be used to select data for logging, or to provide frames of image data for display-only sharing of what is on the display, without remote control.

The examples herein are given with respect to frames comprising image data. However, it is understood that the method and device described may be used for other types of data, including but not limited to audio data, haptic data, and so forth.

Use of the technique offers substantial improvements to the transfer of data between devices. By using this technique, the user interface provided to the developer at the remote control device is improved. For example, the technique allows for the transfer of the most recently changed frames, at no more than the minimum time value, while also providing any final frame without waiting for the minimum time value. As a result, the user interface presented on the remote control device that mirrors what is seen on the display of the PAD is improved.

Use of the technique reduces the amount of data transferred between the PAD and the remote control device. This improves overall efficiency of the system, reduces congestion on the communication interface(s), and increases available bandwidth for other data to be transferred.

FIG. 1 depicts a system 100 for providing data from a proxy access device (PAD) to a remote control device using a rate limiter module, according to one implementation. In this illustration a developer 102 uses a remote control device (RCD) 104 at a first geolocation 106(1). The RCD 104 may comprise a workstation, smartphone, tablet, laptop, server, or other computing device. The RCD 104 may include a remote control module 108 that, when executed by one or more processors of the RCD 104, generates input data 110. The input data 110 may comprise a minimum time value 112, command data 114, and so forth. The minimum time value 112 and the command data 114 are described in more detail below.

The input data 110 is sent to a proxy access device (PAD) 116 at a second geolocation 106(2). The PAD 116 may comprise a workstation, smartphone, tablet, laptop, server, or other computing device.

One or more power supplies 118 may be configured to provide electrical power suitable for operating the components of the PAD 116. In some implementations, the power supply 118 may include a rechargeable battery, fuel cell, photovoltaic cell, power conditioning circuitry, and so forth. In some implementations a proxy host device (not shown) may provide electrical power to the PADs 116 that are coupled thereto. For example, power may be provided to the PADs 116 by way of a USB connection.

The PAD 116 may include one or more hardware processor(s) 120 (processors) configured to execute one or more stored instructions. The processor(s) 120 may include one or more cores. One or more clocks 122 may provide information indicative of date, time, ticks, and so forth. For example, the processor(s) 120 may use data from the clock 122 to generate a timestamp, determine the elapsed time, trigger a preprogrammed action, and so forth.

The PAD 116 may include one or more communication interfaces 124, such as input/output (I/O) interfaces 126, network interfaces 128, and so forth. The communication interfaces 124 may enable the PAD 116, or components of the PAD 116, to communicate with other devices or other components of the PAD 116. The I/O interfaces 126 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 126 may couple to one or more I/O devices 130. The I/O devices 130 may include any manner of input device or output device associated with the PAD 116. For example, I/O devices 130 may include touch sensors, keyboards, mouse devices, microphones, image sensors (e.g., cameras), scanners, displays, speakers, haptic devices, printers, positioning devices, and so forth. The positioning device may comprise one or more of a satellite radionavigation system, inertial navigation system, terrestrial radionavigation system, or other device configured to generate data indicative of the geolocation 106. For example, the satellite radionavigation system may comprise a Global Positioning System (GPS) receiver, the terrestrial radionavigation system may utilize information from the network access points, and so forth. In some implementations, the I/O devices 130 may be physically incorporated with the PAD 116 or may be externally placed.

The network interfaces 128 may be configured to provide communications between the PAD 116 and other devices, such as the routers, access points, and so forth. The network interfaces 128 may include devices configured to couple to one or more networks including local area networks (LANs), wireless local area networks (WLANs), wireless cellular data networks (WCDN), wide area networks (WANs), wireless wide area networks (WWANs), and so forth. For example, the network interfaces 128 may include devices compatible with Ethernet, Wi-Fi, Bluetooth, Zig-Bee, Z-Wave, 3G, 4G, LTE, and so forth.

The PAD 116 may include one or more buses or other internal communications hardware or software that allows for the transfer of data between the various modules and components of the PAD 116.

As shown in FIG. 1, the PAD 116 may include one or more memories 132. The memory 132 may include one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 132 may provide storage of computer-readable instructions, data structures, program modules, and other data for the operation of the PAD 116. A few example modules are shown stored in the memory 132, although the same functionality may alternatively be implemented in hardware, firmware, or as a system on a chip (SoC).

The memory 132 may include one or more operating system (OS) modules 134. The OS module 134 may be configured to manage hardware resource devices such as the I/O interfaces 126, the network interfaces 128, the I/O devices 130, and to provide various services to applications or modules executing on the processors 120. The OS module 134 may implement a variant of the FreeBSD operating system as promulgated by the FreeBSD Project; UNIX or a UNIX-like operating system; a variation of the Linux operating system as promulgated by Linus Torvalds; the Android operating system as promulgated by Google, Inc. of Mountain View, Calif., USA; the Windows operating system from Microsoft Corporation of Redmond, Wash., USA; the Mac OS or iOS promulgated by Apple Inc. of Cupertino, Calif., USA; or other operating systems.

One or more of the following modules may also be stored in the memory 132. The modules may be executed as foreground applications, background tasks, daemons, and so forth. Data may be stored as a flat file, database, linked list, tree, executable code, script, or other data structure to store information. In some implementations, data may be distributed across one or more other devices including other computing devices, network attached storage devices, and so forth.

A communication module 136 may be configured to establish communications with one or more other devices using one or more of the communication interfaces 124. Communications may be authenticated, encrypted, and so forth. The communication module 136 may utilize digital certificates to authenticate the identity of devices involved in the communication. For example, the communication module 136 may be configured to establish a virtual private network (VPN) connection or tunnel with the RCD 104, proxy host device, a management server, and so forth.

The data collection module 138 may be configured to obtain one or more of data associated with operation of the PAD 116. For example, the data collection module 138 may obtain packet captures of network traffic that is being transferred between the PAD 116 and a destination device via the WCDN. For example, the TCPDUMP library promulgated by The Tcpdump Group may be used to acquire the packet captures. In another example, the data collection module 138 may use the MINCAP library available from GitHub to acquire frames of image data representative of images that are to be, or have been, presented on one or more displays of the PAD 116.

The memory 132 may also store a rate limiter module 140. The rate limiter module 140 is configured to process available frames of data and determine which frames are to be one or more of sent to an external device, stored, or otherwise processed. For example, the rate limiter module 140 may be configured to select frames of image data that are to be sent to the RCD 104. In another example, the rate limiter module 140 may be configured to select frames of image data that are to be stored in a log file in the memory 132, or on another device.

During operation the rate limiter module 140 may use the minimum time value 112 to determine a minimum interval at which frames are to be sent. Operation of the rate limiter module 140 is discussed in more detail below with regard to FIGS. 3 and 4.

An application under test (AUT) 142 comprises an application that is being executed at least in part locally on the PAD 116. For example, the AUT 142 may be the application being tested by the developer 102.

The memory 132 may also include stored frames 144. The stored frames 144 comprise those frames of data, or their equivalents, that have been retained and may be sent to the RCD 104 or another device. The stored frames 144 may include image data 146, audio data 148, haptic data 150, and so forth. The image data 146 may comprise images that are intended for presentation on one or more displays of the PAD 116. For example, the image data 146 may be generated by a graphics module, with the image data 146 including images of a user interface that is presented by the PAD 116 to a user. In some situations, the PAD 116 may be "headless" in that it has no physical display. However, the PAD 116 may have a virtual display, or otherwise be able to generate the image data 146.

The audio data 148 comprises data that is representative of at least a portion of one or more sounds. For example, the audio data 148 may comprise a plurality of samples that, when presented by a speaker, produce an audible prompt. The haptic data 150 comprises data that is representative of at least a portion of one or more haptic outputs. For example, the haptic data 150 may comprise a plurality of samples that represent a waveform used to drive a haptic output device such as a motor with an eccentric weight, a piezoelectric transducer, and so forth.

The rate limiter module 140 uses the stored frames 144 to generate output data 152. For example, the rate limiter module 140 may select from the image data 146 a frame that was most recently generated. This selected frame may then be sent to another device. For example, the communication interface 124 may be used to send the output data 152 to the proxy host device, which in turn sends the output data 152 to the RCD 104.

As described below in more detail, the rate limiter module 140 significantly reduces the quantity of data sent by the PAD 116, or logged in memory 132. When the output data 152 is used for remote control, such as by the RCD 104, the rate limiter module 140 provides a better interactive experience due to the low latency and ability to send later frames.

Figure 2:
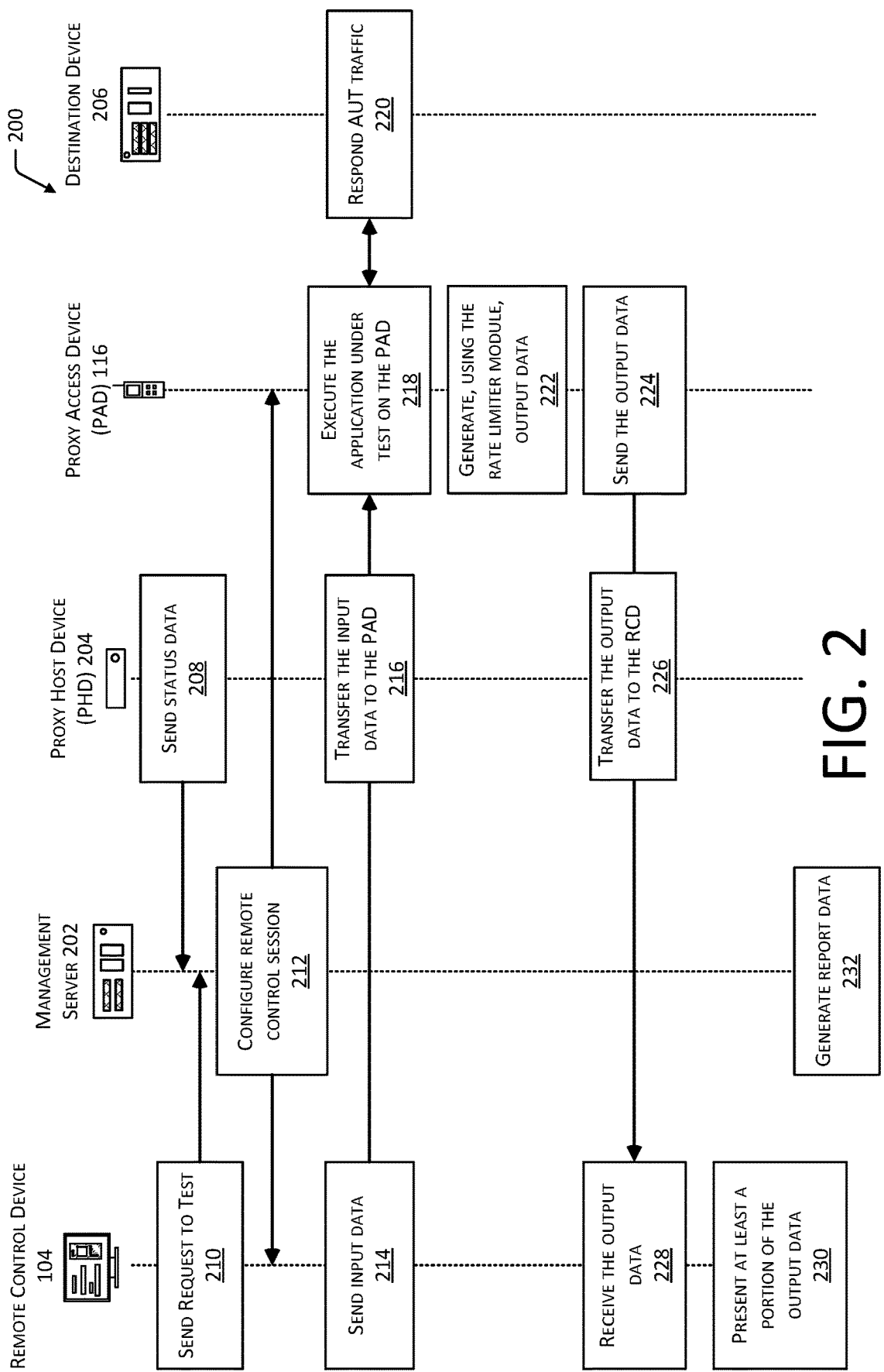
FIG. 2 is a block diagram illustrating remote control of the PAD with output data as provided by the rate limiter module being sent to the remote control device, according to one implementation.

FIG. 2 is a block diagram 200 illustrating remote control of the PAD 116 with output data 152 as provided by the rate limiter module 140 being sent to the remote control device 104, according to one implementation.

In this illustration, the RCD 104, a management server 202, a proxy host device (PHD) 204, the PAD 116, and the destination device 206 are depicted. In some implementations, one or more of the functions described below may be performed by different devices or combination of devices. The RCD 104 is physically located at the first geolocation 106(1). For example, the RCD 104 may be at the developer's 102 office in Sacramento, Calif. The PAD 116 is physically located at a second geolocation 106(2). For example, the cell phone that is being used as the PAD 116 may be located in Sao Paulo, Brazil.

At 208 status data is sent by the PHD 204 to the management server 202. For example, the status data may indicate that the PAD 116 is connected via USB and is currently available for use.

At 210 the RCD 104 sends a request to test. The request may include information such as a particular make and model of PAD 116, files for installation of the AUT 142, environment settings, and so forth.

At 212, the management server 202 configures a remote control session. For example, the management server 202 may provide the files for installation of the AUT 142 to the PHD 204 which then installs the AUT 142 on the PAD 116. An encrypted connection may be established between the RCD 104 and the PHD 204, the PAD 116, or both. For example, a virtual private network (VPN) may be used to encrypt traffic between the RCD 104 and the PAD 116.

At 214 the RCD 104 sends input data 110 to the PHD 204. In this illustration, the PHD 204 receives the input data 110 via a first communication interface 124(1) such as Ethernet and sends it at 216 via a second communication interface 124(2) such as a USB to the PAD 116.

At 218 the PAD 116 executes the AUT 142. During execution, the AUT 142 may send, receive, or send and receive data with the destination device 206. At 220 the destination device 206 may respond to the AUT 142. For example, the AUT 142 may comprise a shopping application which requests a list of available items from a web server.

During execution of the AUT 142, at 222 output data 152 is generated using the rate limiter module 140. Operation of the rate limiter module 140 is discussed in more detail below with regard to FIGS. 3 and 4.

At 224 the output data 152 is sent. For example, the output data 152 may be sent via the USB communication interface to the PHD 204. Continuing the example, at 226 the PHD 204 transfers the output data 152 via Ethernet to the RCD 104. At 228 the RCD 104 receives the output data 152.

The RCD 104 may then present or otherwise use the output data 152. For example, at 230 if the output data 152 comprises image data 146, the RCD 104 may present at least a portion of the image data 146 on a display of the RCD 104.

At 232 the management server 202 may generate report data. For example, the report data may be indicative of the amount of time the PAD 116 was in use, quantity of data transferred between the PAD 116 and the RCD 104, quantity of data transferred between the PAD 116 and the destination device 206, a cost associated with the use of the PAD 116, and so forth. In some implementations the report data may be used to bill the developer 102 or an associated entity for the cost.

Figure 3:
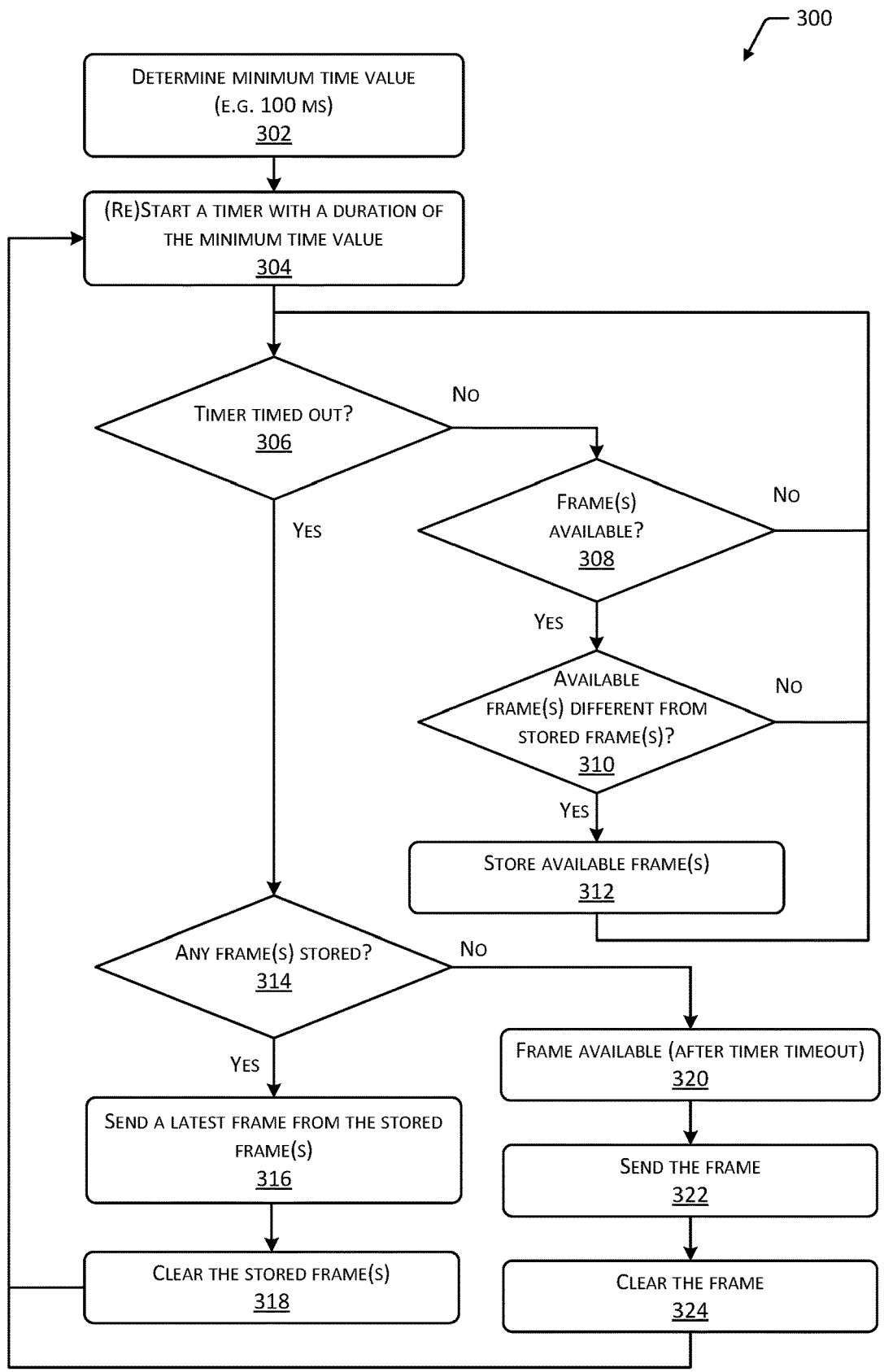
FIG. 3 is a flow diagram of a method for operating a rate limiter module, according to one implementation.

FIG. 3 is a flow diagram 300 of a method for operating a rate limiter module, according to one implementation. The method may be implemented at least in part by the PAD 116.

At 302 a minimum time value 112 is determined. For example, the minimum time value 112 may be specified by a developer 102 who provides input to a user interface. In some implementations the minimum time value 112 may be between 50 and 200 ms. For example, a minimum time value 112 of 100 ms may be used.

At 304 a timer is started with a duration of the minimum time value 112. The timer may count up or count down. When the timer reaches the minimum time value 112, it is in a "timeout" condition.

At 306 a determination is made as to whether the timer has timed out. If not, the method proceeds to 308. At 308 a determination is made as to whether any frames are available for processing. If not, the method returns to 306. If yes, the method proceeds to 310.

At 310 a determination is made as to whether the available frames are different from previously stored frames 144. As described above, frames may be compared to determine if they contain the same data. For example, each frame may be processed with a hash function, and the resulting hash value may be compared. In other implementations, other techniques may be used. For example, information such as quantity of data, compression ratio, and so forth may be compared and used to determine a difference between frames. If yes, the method proceeds to 312. If no, the method returns to 306.

In some implementations the comparison may be made between successive frames. For example, image data 146 with a frame number of 975322 may be compared with image data 146 with a frame number of 975321, and so forth. If a frame is determined at 310 to be different from a previous frame of the same type, at 312 it is stored or designated as a stored frame 144. In some implementations this may include writing or updating a pointer value that refers to a location in memory 132 where the frame of data is stored. In other implementations, this may include writing or copying the frame of data to another memory 132 or memory location. The method may then return to 306.

Returning to 306, when the timer times out, the method proceeds to 314.

At 314 a determination is made as to whether any frames are stored. If yes, the method proceeds to 316.

At 316, a latest or most recent frame from the stored frames 144 is sent. For example, the latest frame may be sent via the USB communication interface 124 to the PHD 204, which in turn sends the latest frame to the RCD 104.

The latest frame may be determined based on position in a buffer, pointer value, timestamp, sequence number, and so forth. For example, if pointer values are issued sequentially as frames become available, the greatest pointer value corresponds to the most recent or latest frame. The latest frame is the frame that is associated with a time that is closest to current time, such as indicated by the clock 122. In some implementations the latest frame may be determined based on time when the data was generated, and not necessarily time that it was created or written into memory 132. For example, there may be some latency between generation of a frame of image data 146 and subsequent entry of that frame into the stored frames 144. In this example, the timestamp or other data indicative of generation may be used.

The method then proceeds to 318. At 318 the stored frames 144 may be cleared, deleted, initialized, and so forth. For example, if the stored frames 144 comprise a data structure with pointers referring to particular locations in memory 132, at 318 these pointers may be deleted or replaced with null values. The process may then proceed to 304, at which the timer is restarted.

Returning to 314, if no frames are stored in the stored frames 144, the process proceeds to 320. In some implementations there may not be a change in the frames of data for longer than the minimum time value 112. For example, while the AUT 142 is processing data, there may be no change to the image presented in the user interface on the PAD 116, and thus there may be no changes in image data 146 that would be included in the stored frames 144.

At 320, a frame becomes available after the timeout. Continuing the example, the AUT 142 may update the user interface presented on the display on the PAD 116 to show the results of processing.

In some implementations a comparison may be made to previously sent frames. For example, the frame that is available after the timeout may be compared with a previously sent frame. If the frame available after the timeout is the same as the previously sent frame, it may be discarded or not sent, and the method may wait for another frame to become available.

At 322 the frame is sent. As described above, this may include sending to the PHD 204 via the USB communication interface 124. The PHD 204 may in turn send the frame to the RCD 104.

At 324 the frame is cleared. For example, the frame may be deleted, overwritten, a pointer referring to the frame may be removed or set to a null value, and so forth. The method then proceeds to 304, at which the timer is restarted.

Figure 4:
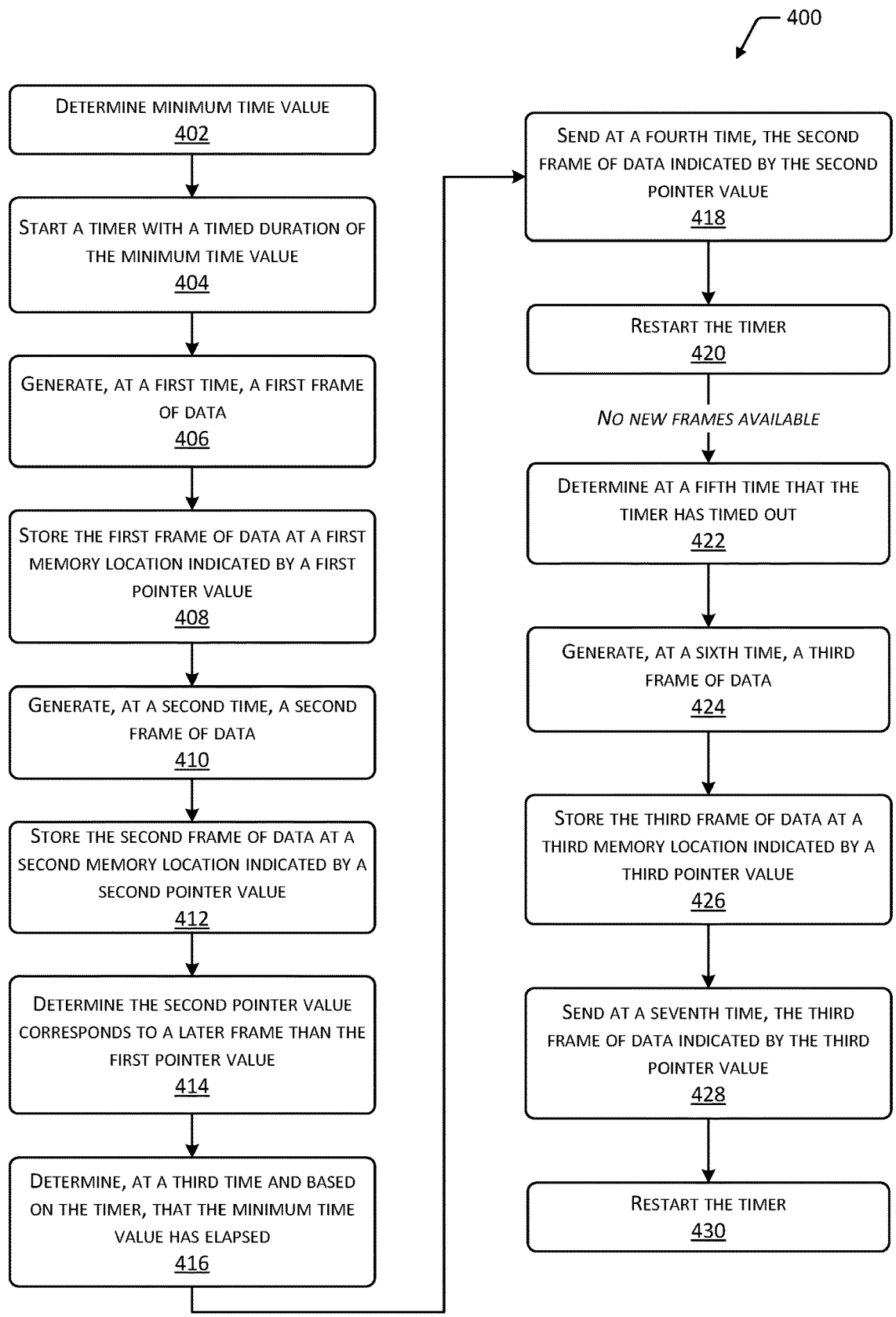
FIG. 4 is a flow diagram of a method for sending frames of data, according to one implementation.

FIG. 4 is a flow diagram 400 of a method for sending frames of data, according to one implementation. The method may be implemented at least in part by the PAD 116.

At 402 a minimum time value 112 is determined. For example, the minimum time value 112 may be set by the developer 102 or an administrator.

At 404 a timer is started with a timed duration of the minimum time value 112.

At 406, at a first time, a first frame of data is generated. For example, the OS module 134 or another module may generate a frame of data comprising image data 146(1) that is designated for presentation on a display of the PAD 116.

At 408 the first frame of data is stored at a first memory location indicated by a first pointer value. For example, the image data 146 may be stored in a memory location in the memory 132.

At 410, at a second time, a second frame of data is generated. For example, the OS module 134 or another module may generate image data 146(2).

At 412 the second frame of data is stored at a second memory location indicated by a second pointer value.

At 414 the second pointer value is determined to correspond to a later frame than the first pointer value. For example, the pointer values may be incremented sequentially as frames of data are received, such that a greatest pointer value corresponds to a frame of data that is most recently available.

At 416, at a third time and based on the timer, a determination is made that the minimum time value 112 has elapsed. For example, the timer may be in the timeout condition.

At 418, at a fourth time, the second frame of data as indicated by the second pointer value is sent. For example, the second frame of data comprising the image data 146(2) may be sent using the USB communication interface 124.

At 420 the timer is restarted.

At 422, at a fifth time, the timer is determined to be in the timeout condition. For example, no frames may have become available during the time window specified by the minimum time value 112.

At 424, at a sixth time, a third frame of data is generated. Continuing the example, the OS module 134 or another module may generate image data 146(3).

At 426, the third frame of data is stored at a third memory location indicated by a third pointer value. In some implementations, the third frame of data may have been previously stored, such as written to a buffer, and the method may update the third point value without copying or re-writing the third frame of data.

At 428, at a seventh time, the third frame of data indicated by the third pointer value is sent. For example, the third frame of data comprising the image data 146(3) may be sent using the USB communication interface 124.

At 430 the timer is restarted. The method may then return to 406 and repeat.

Illustrative Code

One implementation of the method described in this disclosure is shown in the following illustrative code.

```
#include <fcntl.h>
#include <getopt.h>
#include <linux/fb.h>
#include <stdlib.h>
#include <unistd.h>
#include <signal.h>
#include <sys/socket.h>
#include <cmath>
#include <condition_variable>
#include <chrono>
#include <future>
#include <iostream>
#include <mutex>
#include <thread>
#include <Minicap.hpp>
#include "util/debug.h"
#include "JpgEncoder.hpp"
#include "SimpleServer.hpp"
#include "Projection.hpp"
#include "RateLimit.hpp"
#define BANNER_VERSION 1
#define BANNER_SIZE 24
#define DEFAULT_SOCKET_NAME "minicap"
#define DEFAULT_DISPLAY_ID 0
#define DEFAULT_JPG_QUALITY 80
enum {
    QUIRK_DUMB=1,
    QUIRK_ALWAYS_UPRIGHT=2,
    QUIRK_TEAR=4,
};
static void
usage(const char*pname) {
    fprintf(stderr,
    "Usage: % s [-h] [-n<name>]\n"
    "-d<id>: Display ID. (% d)\n"
    "-n<name>: Change the name of the abstract unix domain socket. (% s)\n"
    "-P<value>: Display projection (<w>x<h>@<w>x<h>/{0|90|180|270}). \n"
    "-Q<value>: JPEG quality (0-100). \n"
    "-s: Take a screenshot and output it to stdout. Needs -P. \n"
    "-S: Skip frames when they cannot be consumed quickly enough. \n"
    "-L: Limit frame rate (<interval_ms>). \n"
    "-t: Attempt to get the capture method running, then exit. \n"
    "-i: Get display information in JSON format. May segfault. \n"
    "-h: Show help. \n",
    pname, DEFAULT_DISPLAY_ID, DEFAULT_SOCKET_NAME);
}
//The -L parameter specifies the minimum time value between emitted frames. This definition captures the properties that the first frame after a delay, and the last frame always gets emitted.
class FrameWaiter: public Minicap::FrameAvailableListener {
public:
    FrameWaiter( )
    : mPendingFrames(0),
      mTimeout(std::chrono::milliseconds(100)),
      mStopped(false) {
    }
    int
    waitForFrame( ) {
        std::unique_lock<std::mutex>lock(mMutex);
        while (!mStopped) {
            if (mCondition.wait_for(lock, mTimeout, [this]{return mPendingFrames>0;})) {
                return mPendingFrames--;
            }
        }
        return 0;
    }
    int
    peekForFrame(std::chrono::milliseconds timeout) {
        std::unique_lock<std::mutex>lock(mMutex);
        if (mCondition.wait_for(lock, timeout, [this]{return mPendingFrames>0;})) {
            return mPendingFrames;
        }
        return 0;
    }
    void
    reportExtraConsumption(int count) {
        std::unique_lock<std::mutex>lock(mMutex);
        mPendingFrames-=count;
    }
    void
    onFrameAvailable( ) {
        std::unique_lock<std::mutex>lock(mMutex);
        mPendingFrames+=1;
        mCondition.notify_one( );
    }
    void
    stop( ) {
        mStopped=true;
    }
    bool
    isStopped( ) {
        return mStopped;
    }
private:
    std::mutex mMutex;
    std::condition_variable mCondition;
    std::chrono::milliseconds mTimeout;
    int mPendingFrames;
    bool mStopped;
};
static int
pumpf(int fd, unsigned char*data, size_t length) {
    do {
        //We can avoid generating a SIGPIPE even if the socket doesn't
        //exist anymore. We'll still get an EPIPE which works.
        int wrote=send(fd, data, length, MSG_NOSIGNAL);
        if (wrote<0) {
            return wrote;
```

```
        }
        data+=wrote;
        length-=wrote;
    }
    while (length>0);
    return 0;
}
static int
pumpf(int fd, unsigned char*data, size_t length) {
    do {
        int wrote=write(fd, data, length);
        if (wrote<0) {
            return wrote;
        }
        data+=wrote;
        length-=wrote;
    }
    while (length>0);
    return 0;
}
static int
putUInt32LE(unsigned char*data, int value) {
    data[0]=(value & 0x000000FF)>>0;
    data[1]=(value & 0x0000FF00)>>8;
    data[2]=(value & 0x00FF0000)>>16;
    data[3]=(value & 0xFF000000)>>24;
}
static int
try_get_framebuffer_display_info(uint32_t displayId,
Minicap::DisplayInfo*info) {
    char path[64];
    sprintf(path, "/dev/graphics/fb % d", displayId);
    int fd=open(path, O_RDONLY);
    if (fd<0) {
        MCERROR("Cannot open % s", path);
        return -1;
    }
    fb_var_screeninfo vinfo;
    if (ioctl(fd, FBIOGET_VSCREENINFO, &vinfo)<0) {
        close(fd);
        MCERROR("Cannot get FBIOGET_VSCREENINFO of
            % s", path);
        return -1;
    }
    info→width=vinfo.xres;
    info→height=vinfo.yres;
    info→orientation=vinfo.rotate;
    info→xdpi=static_cast<float>(vinfo.xres)/
static_cast<float>(vinfo.width)*25.4;
    info→ydpi=static_cast<float>(vinfo.yres)/
static_cast<float>(vinfo.height)*25.4;
    info→size=std::sqrt((static_cast<float>(vinfo.width)
*static_cast<float>(vinfo.width))+(static_cast<float>(vin-
fo.height)*static_cast<float>(vinfo.height)))/25.4;
    info→density=std::sqrt((static_cast<float>(vinfo.xres)
*static_cast<float>(vinfo.xres))+(static_cast<float>(vin-
fo.yres)*static_cast<float>(vinfo.yres)))/info→size;
    info→secure=false;
    info→fps=0;
    close(fd);
    return 0;
}
static FrameWaiter gWaiter;
static void
signal_handler(int signum) {
    switch (signum) {
    case SIGINT:
        MCINFO("Received SIGINT, stopping");
        gWaiter.stop( );
        break;
    case SIGTERM:
        MCINFO("Received SIGTERM, stopping");
        gWaiter.stop( );
        break;
    default:
        abort( );
        break;
    }
}
int
main(int argc, char*argv[ ]) {
    const char*pname=argv[0];
    const char*sockname=DEFAULT_SOCKET_NAME;
    uint32_t displayId=DEFAULT_DISPLAY_ID;
    unsigned int quality=DEFAULT_JPG_QUALITY;
    bool showInfo=false;
    bool takeScreenshot=false;
    bool skipFrames=false;
    bool testOnly=false;
    RateLimit;
    Projection proj;
    int opt;
    while ((opt=getopt(argc, argv, "d:n:P:Q:siSL:th"))!=-1) {
        switch (opt) {
        case 'd':
            displayId=atoi(optarg);
            break;
        case 'n':
            sockname=optarg;
            break;
        case 'P': {
            Projection::Parser;
            if (!parser.parse(proj, optarg, optarg+strlen(optarg))) {
                std::cerr<<"ERROR: invalid format for -P, need
                    <w>x<h>@<w>x<h>/{0|90|180|270}"<<std::
                    endl;
                return EXIT_FAILURE;
            }
            break;
        }
        case 'Q':
            quality=atoi(optarg);
            break;
        case 's':
            takeScreenshot=true;
            break;
        case 'i':
            showInfo=true;
            break;
        case 'S':
            skipFrames=true;
            break;
        case 'L': {
            RateLimit::Parser parser;
            if (!parser.parse(rateLimit, optarg, optarg+strlen
                (optarg))) {
                std::cerr<<"ERROR: invalid format for -L, need
                    <interval_ms>"<<std::endl;
                return EXIT_FAILURE;
            }
            break;
        }
        case 't':
            testOnly=true;
```

```
    break;
  case 'h':
    usage(pname);
    return EXIT_SUCCESS;
  case '?':
  default:
    usage(pname);
    return EXIT_FAILURE;
  }
}
//Set up signal handler.
struct sigaction sa;
memset(&sa, 0, sizeof(sa));
sa.sa_handler=signal_handler;
sigemptyset(&sa.sa_mask);
sigaction(SIGTERM, &sa, NULL);
sigaction(SIGINT, &sa, NULL);
//Start Android's thread pool so that it will be able to serve
our requests.
minicap start thread pool( );
if (showInfo) {
Minicap::DisplayInfo info;
if (minicap_try_get_display_info(displayId, &info)!=0) {
    if (try_get_framebuffer_display_info(displayId, &info)
        !=0) {
      MCERROR("Unable to get display info");
      return EXIT_FAILURE;
    }
}
int rotation;
switch (info.orientation) {
  case Minicap::ORIENTATION_0:
    rotation=0;
    break;
  case Minicap::ORIENTATION_90:
    rotation=90;
    break;
  case Minicap::ORIENTATION_180:
    rotation=180;
    break;
  case Minicap::ORIENTATION_270:
    rotation=270;
    break;
}
std::cout.precision(2);
std::cout.setf(std::ios_base::fixed,    std::ios_base::float-
    field);
std::cout<<"{"<<std::endl
    <<"\"id\":"<<displayId<<","<<std::endl
    <<"\"width\":"<<info.width<<","<<std::endl
    <<"\"height\":"<<info.height<<","<<std::endl
    <<"\"xdpi\":"<<info.xdpi<<","<<std::endl
    <<"\"ydpi\":"<<info.ydpi<<","<<std::endl
    <<"\"size\":"<<info.size<<","<<std::endl
    <<"\"density\":"<<info.density<<","<<std::endl
    <<"\"fps\":"<<info.fps<<","<<std::endl
    <<"\"secure\":"<<(info.secure?    "true":    "false")
        <<","<<std::endl
    <<"\"rotation\":"<<rotation<<std::endl
    <<"}"<<std::endl;
    return EXIT_SUCCESS;
}
proj.forceMaximumSize( );
proj.forceAspectRatio( );
if (!proj.valid( )) {
std::cerr<<"ERROR: missing or invalid -P"<<std::endl;
return EXIT_FAILURE;
}
std::cerr<<"PID:"<<getpid( )<<std::endl;
std::cerr<<"INFO: Using projection"<<proj<<std::endl;
//Disable STDOUT buffering.
setbuf(stdout, NULL);
//Set real display size.
Minicap::DisplayInfo realInfo;
realInfo.width=proj.realWidth;
realInfo.height=proj.realHeight;
//Figure out desired display size.
Minicap::DisplayInfo desiredInfo;
desiredInfo.width=proj.virtualWidth;
desiredInfo.height=proj.virtualHeight;
desiredInfo.orientation=proj.rotation;
//Leave a 4-byte padding to the encoder so that we can
inject the size
//to the same buffer.
JpgEncoder encoder(4, 0);
Minicap::Frame frame;
bool haveFrame=false;
//Server config.
SimpleServer server;
//Set up minicap.
Minicap*minicap=minicap_create(displayId);
if (minicap==NULL) {
return EXIT_FAILURE;
}
//Figure out the quirks the current capture method has.
unsigned char quirks=0;
switch (minicap→getCaptureMethod( )) {
  case Minicap::METHOD_FRAMEBUFFER:
    quirks|=QUIRK_DUMB|QUIRK_TEAR;
    break;
  case Minicap::METHOD_SCREENSHOT:
    quirks|=QUIRK_DUMB;
    break;
  case Minicap::METHOD_VIRTUAL_DISPLAY:
    quirks|=QUIRK_ALWAYS_UPRIGHT;
    break;
}
if (minicap→setRealInfo(realInfo)!=0) {
MCERROR("Minicap did not accept real display info");
goto disaster;
}
if (minicap→setDesiredInfo(desiredInfo)!=0) {
MCERROR("Minicap did not accept desired display
    info");
goto disaster;
}
minicap→setFrameAvailableListener(&gWaiter);
if (minicap→applyConfigChanges( )!=0) {
MCERROR("Unable to start minicap with current con-
    fig");
goto disaster;
}
if (!encoder.reserveData(realInfo.width, realInfo.height))
{
MCERROR("Unable to reserve data for JPG encoder");
goto disaster;
}
if (takeScreenshot) {
if (!gWaiter.waitForFrame( ) {
    MCERROR("Unable to wait for frame");
    goto disaster;
}
int err;
```

```
if ((err=minicap->consumePendingFrame(&frame))!=0)
{
  MCERROR("Unable to consume pending frame");
  goto disaster;
}
if (!encoder.encode(&frame, quality)) {
  MCERROR("Unable to encode frame");
  goto disaster;
}
if (pumpf(STDOUT_FILENO, encoder.getEncodedData(
    ), encoder.getEncodedSize( )<0) {
  MCERROR("Unable to output encoded frame data");
  goto disaster;
}
return EXIT_SUCCESS;
}
if (testOnly) {
if (gWaiter.waitForFrame( )<=0) {
  MCERROR("Did not receive any frames");
  std::cout<<"FAIL"<<std::endl;
  return EXIT_FAILURE;
}
minicap_free(minicap);
std::cout<<"OK"<<std::endl;
return EXIT_SUCCESS;
}
if (!server.start(sockname)) {
MCERROR("Unable to start server on namespace '%s'",
    sockname);
goto disaster;
}
//Prepare banner for clients.
unsigned char banner[BANNER_SIZE];
banner[0]=(unsigned char) BANNER_VERSION;
banner[1]=(unsigned char) BANNER_SIZE;
putUInt32LE(banner+2, getpid( );
putUInt32LE(banner+6, realInfo.width);
putUInt32LE(banner+10, realInfo.height);
putUInt32LE(banner+14, desiredInfo.width);
putUInt32LE(banner+18, desiredInfo.height);
banner[22]=(unsigned char) desiredInfo.orientation;
banner[23]=quirks;
int fd;
while (!gWaiter.isStopped( ) && (fd=server.accept( ))>0)
{
MCINFO("New client connection");
if (pumps(fd, banner, BANNER_SIZE)<0) {
  close(fd);
  continue;
}
bool lastEmit=false;
std::chrono::high_resolution_clock::time_point lastEmit-
    Time;
int pending, err;
while      (!gWaiter.isStopped(       )    &&
    (pending=gWaiter.waitForFrame( )>0) {
  if (skipFrames && pending>1) {
    //Skip frames if too many.
    gWaiter.reportExtraConsumption(pending −1);
    while (--pending>=1) {
      if    ((err=minicap->consumePendingFrame
          (&frame))!=0) {
        if (err==-EINTR) {
          MCINFO("Frame consumption interrupted by
              EINTR");
          goto close;
        }
      else {
        MCERROR("Unable to skip pending frame");
        goto disaster;
      }
    }
    minicap->releaseConsumedFrame(&frame);
  }
}
if    ((err=minicap->consumePendingFrame(&frame))
    !=0) {
  if (err==-EINTR) {
    MCINFO("Frame consumption interrupted by
        EINTR");
    goto close;
  }
  else {
    MCERROR("Unable   to   consume   pending
        frame");
    goto disaster;
  }
}
haveFrame=true;
if (0<rateLimit.interval.count( ) && lastEmit) {std::
    chrono::milliseconds    timeout=rateLimit.interval-
    std::chrono::duration_cast<std::chrono::millisec-
    onds>(std::chrono::high_resolution_clock::
    now( )-lastEmitTime));
  if (0<timeout.count( ) && 0<gWaiter.peekForFrame
      (timeout)) {
    minicap->releaseConsumedFrame(&frame);
    haveFrame=false;
    continue;
  }
}
//Encode the frame.
if (!encoder.encode(&frame, quality)) {
  MCERROR("Unable to encode frame");
  goto disaster;
}
//Send the frame synchronously to increase speed.
unsigned char*data=encoder.getEncodedData( )-4;
size_t size=encoder.getEncodedSize( );
putUInt32LE(data, size);
if (pumps(fd, data, size+4)<0) {
  break;
}
//This will call onFrameAvailable( ) on older devices,
    so we have
//to do it here or the loop will stop.
minicap->releaseConsumedFrame(&frame);
haveFrame=false;
lastEmit=true;
lastEmitTime=std::chrono::high_resolution_clock::
    now( );
MCINFO("Emitted frame");
}
close:
MCINFO("Closing client connection");
close(fd);
//Have we consumed one frame but are still holding it?
if (haveFrame) {
  minicap->releaseConsumedFrame(&frame);
}
minicap_free(minicap);
return EXIT_SUCCESS;
``` disaster:
```
if (haveFrame) {
minicap→releaseConsumedFrame(&frame);
}
minicap_free(minicap);
return EXIT_FAILURE;
}
```

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A first device comprising:
a communication interface;
one or more memories storing computer-executable instructions; and
one or more hardware processors to execute the computer-executable instructions to:
execute an application under test;
determine a minimum time value;
start a timer with a timed duration of the minimum time value;
generate, at a first time during the timed duration, a first frame of data;
store the first frame of data at a first memory location indicated by a first pointer value;
generate, at a second time during the timed duration, a second frame of data;
store the second frame of data at a second memory location indicated by a second pointer value;
determine, at a third time and based on the timer, that the timed duration of the minimum time value has elapsed;
determine that the second pointer value corresponds to a later frame than the first pointer value;
in response to determining that the timed duration of the minimum time value has elapsed, at a fourth time, use he communication interface to send, to a second device, the second frame of data indicated by the second pointer value;
restart the timer with the timed duration of the minimum time value;
determine, at a fifth time, that the timed duration of the minimum time value has elapsed;
determine that no frame of data was stored between the fourth time and the fifth time;
generate, at a sixth time, a third frame of data;
store the third frame of data at a third memory location indicated by a third pointer value; and
in response to determining that no frame of data was stored between the fourth time and the fifth time, at a seventh time, use the communication interface to send the third frame of data indicated by the third pointer value.

2. The first device of claim 1, further comprising:
a display to present images; and
wherein the first frame of data, the second frame of data, and the third frame of data each comprise image data representative of an image for presentation on the display.

3. The first device of claim 1, wherein the minimum time value is from 50 milliseconds to 200 milliseconds.

4. The first device of claim 1, the one or more hardware processors to execute the computer-executable instructions to:
determine the second frame of data differs from the first frame of data, wherein storage of the second frame of data is in response to determining that the second frame of data differs from the first frame of data; and
determine the third frame of data differs from the second frame of data, wherein storage of the third frame of data is responsive to determining that the third frame of data differs from the second frame of data.

5. The first device of claim 1, the one or more hardware processors to execute the computer-executable instructions to:
after sending the second frame of data, delete the first pointer value and the second pointer value; and after sending the third frame of data, delete the third pointer value.

6. A computer-implemented method comprising:
determining a minimum time value;
starting a timer with a timed duration of the minimum time value;
during the timed duration, determining availability of a first set of one or more frames of data;
during the timed duration, determining that a first frame in the first set of one or more frames of data is different from a previously available frame;
during the timed duration, in response to the first frame being different from the previously available frame, storing the first frame using a first device;
determining a first lapse of the timed duration;
determining the first frame is a most recent frame in the first set of one or more frames of data that was stored using the first device; and
in response to the determining the first lapse of the timed duration, sending the first frame, that is the most recent frame in the first set of one or more frames of data, from the first device to one or more of: a memory or a second device.

7. The computer-implemented method of claim 6, further comprising:
determining one or more of: a pointer value associated with a frame of data, a sequence number associated with the frame of data, or a timestamp associated with the frame of data;
wherein the determining that the first frame is the most recent frame is based at least in part on the one or more of the pointer value, the sequence number, or the timestamp.

8. The computer-implemented method of claim 6, wherein the first set of one or more frames of data includes one or more of: image data, audio data, or haptic data.

9. The computer-implemented method of claim 6, wherein the minimum time value is from 50 milliseconds to 150 milliseconds.

10. The computer-implemented method of claim 6, further comprising:
restarting the timer with the timed duration of the minimum time value;
determining a second lapse of the timed duration;
determining that no frame of data was stored between the first lapse and the second lapse;
determining, after the second lapse, availability of a second set of one or more frames of data; and
in response to the determining that no frame of data was stored between the first lapse and the second lapse, sending a selected frame of the second set of one or more frames of data to the second device.

11. The computer-implemented method of claim 10, further comprising:
determining that the selected frame of the second set of one or more frames of data is different from the first frame, wherein the selected frame is sent to the second device in response to the determining that the selected frame is different from the first frame.

12. The computer-implemented method of claim 6, wherein the sending of the first frame comprises one or more of:
storing the first frame in the memory; or
sending the first frame to the second device using a communication interface.

13. The computer-implemented method of claim 6, further comprising:
receiving user input indicative of the minimum time value, wherein the minimum time value is determined based on the user input.

14. A first device comprising:
one or more memories storing computer-executable instructions; and
one or more hardware processors to execute the computer-executable instructions to:
determine a minimum time value;
start a timer with a timed duration of the minimum time value;
determine a first lapse of the timed duration;
determine whether a frame of data was stored during the timed duration;
determine, after the first lapse of the timed duration, availability of a first set of one or more frames of data; and
in response to determining that no frame of data was stored during the timed duration, send a selected frame of the first set of one or more frames of data, that is different from a previously sent frame, to one or more of a second device or the one or more memories.

15. The first device of claim 14, the one or more hardware processors to execute the computer-executable instructions to:
restart the timer with the timed duration of the minimum time value;
determine availability of a second set of one or more frames of data before a second lapse of the timed duration;
determine the second lapse of the timed duration;
determine a first frame that is a most recent frame in the second set of one or more frames of data;
determine the first frame in the second set of one or more frames of data is different from a second frame that precedes the first frame in the second set of one or more frames of data; and
in response to the second lapse of the timed duration, send the first frame to the second device.

16. The first device of claim 15, further comprising the computer-executable instructions to determine one or more of:
a pointer value associated with the first frame,
a sequence number associated with the first frame, or
a timestamp associated with the first frame;
wherein the first frame is determined to be the most recent frame in the second set of the one or more frames of data based at least in part on the one or more of the pointer value, the sequence number, or the timestamp.

17. The first device of claim 14, wherein the computer-executable instructions to send the selected frame include computer-executable instructions to one or more of:
store the selected frame in the one or more memories; or
send the selected frame to the second device using a communication interface.

18. The first device of claim 14, wherein the first set of one or more frames of data comprise one or more of:
image data,
audio data, or
haptic data.

19. The first device of claim 14, further comprising computer-executable instructions to:
determine the previously sent frame; and
determine that the selected frame of the first set of one or more frames of data is different from the previously sent frame, wherein the selected frame is sent further in response to determining that the selected frame is different from the previously sent frame.

20. The first device of claim 14, further comprising:
a display to present images, wherein the selected frame comprises image data representative of an image for presentation on the display.

\* \* \* \* \*

UNITED STATES PATENT AND TRADEMARK OFFICE
CERTIFICATE OF CORRECTION

PATENT NO. : 11,019,129 B1
APPLICATION NO. : 16/056797
DATED : May 25, 2021
INVENTOR(S) : Brien Colwell et al.

It is certified that error appears in the above-identified patent and that said Letters Patent is hereby corrected as shown below:

On the Title Page
Page 2, Column 2, (56) References Cited: Line 13:
The examiner's last name listed on reference "Non-final Office Action dated June 2, 2016, U.S. Application No. 14/850,798, The United States Patent and Trademark Office, June 2, 2016:
Currently reads: "Joan"
When it should read: --Doan--

In the Claims
Column 20, Claim 4, Line 61:
Currently reads: "is responsive to determining"
When it should read: --is in response to determining--

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*